Patented June 13, 1950

2,511,299

UNITED STATES PATENT OFFICE 2,511,299

WATER TREATING METHOD

William Seifriz, Glen Riddle, and Eugene J. McCue, Chester Springs, Pa., assignors to Edward S. Mead, Philadelphia, Pa.

No Drawing. Application July 24, 1946, Serial No. 685,920

5 Claims. (Cl. 210—23)

Our invention relates to a method of treating fluids for the removal of impurities, and more particularly to a process for treatment of water to precipitate and remove foreign matter therefrom.

In industrial and mining operations involving the use of water for cleaning purposes in "closed" systems and in systems where the emission of any effluent into public streams must be freed from suspended solids, it is necessary to remove foreign matter from the water. In the latter case, sources of water supply such as rivers, streams, etc. may otherwise become polluted by the presence of such foreign matter as organic proteins.

Procedures for flocculation and removal of such matter have therefore been developed by the use of chemicals and other substances, as reagents.

In addition to the many reagents sold under various trade names, the use of starches from many sources, such as potatoes, corn, wheat, tapioca, etc. have been tried in combination with caustics prepared in many different ways and are being extensively used and recommended in the precipitation of solids from washery water in coal cleaning plants, as the most satisfactory method available at the present time even though they fall far short of desired performance due to the difficulty of maintaining a uniform flocculation, because causticized starch tends to create a slime in the settled solids which retards filtering.

In one such process employed by a large bituminous coal cleaning plant, causticized starch, two parts starch and one part sodium hydroxide, is used in the washery water, 1% solution. In this plant the total amount of washery water required for efficient washing is 7000 gallons per minute. The speed of precipitation using the starch solution is such that only 1000 gallons per minute of clean water can be obtained from an 85' settling tank with a retention time of 280 minutes. In addition to the slow rate of precipitation of the larger particles when using the 1% solution of causticized starch, it was found that the colloidal particles were not precipitated in 280 minutes but remained in suspension leaving the water cloudy and turbid.

These limitations of starch reagents and others become more manifest as the problems of sedimentation become more difficult because of the greater amount of foreign matter introduced into the cleaning operation because of mechanical mining and loading. In some cases the increase in solid content in washery waters is two to three times as great as heretofore.

Although it is a simple matter to separate the larger coal particles from the water, the low specific gravity of the finer particles of colloidal size renders it extremely difficult to effect separation in commercial practice.

The essence of our invention resides in a novel process for aggregating these particles into groups which are of relatively large size, greatly reduced total surface area, and of higher specific gravity; as a result the rate of precipitation, that is to say, the rate of settling is materially increased over the present practice.

This we effect by adding to the washery water an alkaline substance such as sodium hydroxide, calcium hydroxide, trisodium phosphate, etc., and then adding to the washery water so treated a salt of zinc, such as zinc chloride, although as will appear hereinafter, other metallic salts may be used.

Accordingly an object of our invention is to provide a novel process for the purification of water.

A further object of our invention is to reduce the total surface area through coalescence and thereby increase the size and the specific gravity of the particles, thus greatly accelerating the precipitation of impurities in coal washery water, sewage, industrial wastes, etc.

These and other objects of our invention will appear in the detailed description which follows:

Inasmuch as we have experimentally applied our invention to coal washery water, we shall describe the detailed procedure in that example, although it will be understood that the invention has application in any case where precipitation is desired.

Solids in coal washery water consist of large size particles plus 48 mesh, and these can be removed with little difficulty.

The minute colloidal particles, those among them which are protein may well be of molecular dimensions, are prevented from coalescing by their electric charge. An examination of the washery water with the ultra-microscope shows active Brownian movement of these particles.

To such washery water we admit two grains per gallon of an alkaline substance such as sodium hydroxide, calcium hydroxide, tri-sodium phosphate, etc., or sufficient to build up the pH to approximately 10.6 or over and when the washery water has been uniformly alkalized, we admit 1 to 2 grains of technical grade zinc chloride. Although the quantity is not critical in any pH range on the alkaline side, the speed of precipitation can be controlled by increasing the amounts of alkaline substances and zinc salts where faster flocculation and precipitation is desired or vice versa.

These reagents are introduced into the washery water in the launders in the order described above, before it reaches the settling tanks, where the flocculation and precipitation takes place and the compressed solids removed. In the above test in a pilot plant, we were able to maintain a flow of washery water containing 6 to 12 percent solids, of 50 gallons per minute in a tank with a capacity of 400 gallons, and secure crystal clear effluent with eight minutes retention time, whereas the present methods used at the washery plant maintain 1000 gallons per minute into a tank with 280,000 gallons capacity or 280 minutes retention time, with only partial precipitation, the colloids being discharged with the effluent.

In another experiment where the washery water in the coal cleaning plant is presently treated with causticized starch, two parts starch and one part caustic soda, 1% solution being added to the washery water and the pH raised to 10, we added a minute quantity of calcium hydroxide, less than 1 grain to the gallon, and then admitted 2 grains of zinc sulphate per gallon and the same results as to speed of precipitation were obtained.

In addition, we were able to increase the speed of filtering to correspond to the speed of precipitation, whereas when the causticized starch was used alone, the speed of filtering fell far behind the speed of precipitation and made it necessary to reduce the feed to the thickening device in order to avoid building up an excess of compressed solids in the settling tank.

Although in the above we have described the use of causticized starch in solution with zinc salt, we have found that the use of starch is not necessary in the precipitation of colloidal suspensions by zinc salts.

Comparative rates of precipitation when starch is used with and without a zinc salt are given in the following experiment:

Two tests were run, each for twelve hours. 1% solution of causticized starch (two parts starch; one part sodium hydroxide) raising the pH to 10.8 was used in the first test. In the second test 1% solution of causticized starch (two parts starch; one part sodium hydroxide) raising the pH to 10.8 plus 2 grains per gallon of zinc sulphate was used. In the first test the aggregation was slow and the flocculated mass hung in suspension in the form of a cloud, clearing very slowly. In the second test, using the zinc salt in conjunction with the causticized starch solution, the precipitation was far greater, the water clearing rapidly. The acceleration due to the zinc ion is twenty fold, the colloidal particles even of molecular dimension precipitating with almost the same speed as the larger particles leaving the increased overflow crystal clear.

We have found, however, that our novel process using salts of zinc in conjunction with alkaline solutions, without starch, is just as effective and greatly reduces the cost as starch is an expensive reagent.

Although in the above experiments we have described the use of zinc salts, we have found that other metallic salts can be used.

In the above we have described our invention as applied to coal washery water. It has many other fields of use. Thus, further by way of example, it is possible to eliminate the use of more expensive methods of softening boiler waters by our invention. In this treatment lesser quantities of alkaline substances such as caustic soda (sodium hydroxide), tri-sodium phosphate and calcium hydroxide are used and also lesser quantities of zinc salts thus effecting a finer flocculation which can be readily filtered out.

It is further possible to apply our novel process for reducing the bacteria count in raw drinking water, sewage disposal effluents, etc., by precipitating the colloidal particles which carry the bacteria. Many experiments show that raw water badly polluted and carrying a bacteria count of 380,000 total count, 170,000 red and 100,000 $B.$ $coli$ after treatment with our process using ½ grain per gallon of sodium hydroxide to raise the alkalinity to 9.8 pH and then adding ½ grain zinc chloride and filtering, reduced the total count to less than 100 with no reds and no $B.$ $coli.$ The theory of operation is as follows: three distinct processes are involved. All are familiar in colloid chemistry, but they are here combined in one method employing the most efficient salt. The fact that three familiar colloidal phenomena are operative at one and the same time accounts in major part for the efficiency of the method; and to this is to be added the efficiency of the salt used. The first process bringing about sedimentation is that of decharging the particles. This is common colloidal phenomenon. Most colloidal particles are negatively charged. All living cells are negatively charged and these obviously include living bacteria. Such negative particles are decharged and therefore precipitated by cations or positively charged ions such as zinc. But the precipitation is not always complete; often the more minute of the colloidal particles are left in suspension.

It is not generally known that within a valence group certain ions are more effective as precipitating agents than others. Zinc, cadmium and mercury constitute a distinct group apart from other bivalent elements such as magnesium, calcium and barium. Why this should be true is evident from a comparison of the outer two electronic shells; each of the bivalent elements has two electrons in its outermost valence shell, but zinc, cadmium and mercury have eighteen electrons in the next inner shell whereas the other bivalent elements have but eight electrons in the second inner shell.

The effect of the second electron layer on valence is now generally recognized. The behavior of elements is in part dependent on the electronic fields around the atoms, and the intensity and distribution of these fields are reflected in the electronegativity of the atoms. Elements with eighteen electrons in the electron orbit below the valence layer exhibit variable valence, whereas elements with eight electrons in the orbit below the outer layer have only one valence. This is why zinc, cadmium and mercury constitute a distinct group among the bivalent elements and are more efficient as precipitating agents. It is this fact which has been generally overlooked and is embodied in our claim.

The precipitation of inorganic colloidal matter, such as the quartz particles in river water sedimented by the salts of the sea, is brought about by decharging the particles, and this is sufficient; but organic colloidal matter is usually hydrolyzed, the water mantle as well as the electric charge serving to stabilize the particles. Consequently, a precipitating agent which will both dehydrolyze and decharge will be more effective than an agent which accomplishes only one or the other.

Actually in precipitating proteins, both decharging and dehydrating are necessary. Ordinarily a salt is required to decharge and an alcohol to dehydrate. But in the precipitation of organic matter, such as is here considered, zinc salts accomplish both reactions, the non-specific one of decharging and the specific one of dehydrating. Other bivalent actions such as calcium, will accomplish one of these reactions, that of decharging, but zinc accomplishes both types of reactions; and not unless both protective layers of the organic particles in colloidal suspension are removed, that is to say, unless the particles are both decharged and dehydrated do they coalesce and fall.

The third process which is an essential feature of our invention is that involving a heavy flocculent precipitation produced by the interaction of the hydroxide and the metal salt. An insoluble hydroxide of the metal is produced and it comes down carrying all else with it, clearing the turbid water much in the same way that rain clears the atmosphere. This flocculent precipitation performs the function of the starch paste sometimes used to bring down suspended colloidal matter, but it does it with much greater efficiency and greater speed than the starch paste, and avoids the slimy "hard to filter" mass formed by the starch. It is in short a much cleaner as well as more effective precipitating reaction. The need of the high alkalinity is thus evident.

The above method is that best suited for clearing industrial wastes or washery water in coal cleaning or ore cleaning plants or in any situation where speed of precipitation is a vital factor. The alkalinity should be high, over 10 pH, and the salt added at least two grains per gallon. Precipitation is then rapid and complete. However, in water purification and in all situations where speed of precipitation is not an important factor, it is better to use a lower degree of alkalinity, a pH of less than 10 and a minimum salt concentration, one grain or less per gallon. Flocculation is still complete but precipitation is slow. The only disadvantage of this slower method is loss of speed of settling; however, the flocculation is complete and the fine "floc" is readily filtered out, leaving the water crystal clear, as clear as before but without the excessive alkalinity and the greater amount of salt. In water purification loss of speed in settling is not important, whereas the reduction in alkalinity and the saving of salt, both from the view of cost and water taste, are very important.

Without laying undue emphasis on any one of the three types of precipitating reactions involved, it should be pointed out that the three processes take care of all possibilities. First, the larger inorganic colloidal particles are brought down by decharging; this results in coalescence, reduction in surface, increase in weight, and consequent settling. Second, as proteins are held in colloidal suspension not only by their electrical environment, whether this is a double layer or a more dispersed cloud of ions, but also by an envelope of oriented water molecules, the protein colloidal particle is both charged and hydrated, and both layers are protective. Consequently, to precipitate such protein particles they must be both decharged and dehydrated, and these are accomplished by our method. Finally, the heavy flocculate produced by the interaction of alkali and zinc or other metallic salt brings down all remaining particles, in particular the very small colloidal particles which are precipitated with difficulty by salt alone.

All bacteria which adhere to the colloidal particles in suspension are also brought down as the great reduction in bacterial count shows.

The completeness of the precipitation is strikingly revealed by the great clarity of the water. Furthermore, when after the process is complete and the water is viewed with the ultramicroscope, it is found to be wholly free of colloidal particles in Brownian movement. Bacteria counts likewise reveal the completeness of the reaction, a reaction count of 2,500,000 per cc. taken before precipitation is reduced to 100 after precipitation.

As the interaction between the alkali and the salt is stoichiometric, this means that when both are added in proper proportion, they are both brought down in a changed form with the precipitate, for they are the precipitate. This means that no metallic zinc should remain in the cleared water.

The objectionable taste of sodium hydroxide is avoided by the use of calcium hydroxide.

As many washery waters, river waters which contain sewage, etc., contain large amounts of organic matter in suspension, their precipitation by zinc salts should, on the basis of the above theoretical reasoning, be more effectively brought about, and experimentation shows this to be true.

This knowledge, gained during experimental studies on flocculation, we have put to practical use in the sedimentation of coal and ore washery waters, city drinking water, etc. The ion which proved most effective in the flocculation of colloidal suspensions was zinc. On the basis of general colloidal principles, zinc should be no more effective than other bivalent ions, yet it is more so whether used as the chloride or the sulphate, although the chloride was found slightly more effective than the sulphate.

For most effective sedimentation, a pH of 10 or higher is best. This is true for two reasons. First, on the addition of the metallic salt a non-soluble precipitation is formed which carries all colloidally suspended matter with it; and second, where much of the suspended matter is protein, as is true of sewage and like waters, the proteins come down at their isoelectric points. One such point is commonly at a high alkaline value, which in many naturally occurring proteins is between 9 and 10, the same acidity range as that in which the maximum flocculation by zinc sulphate, of organic matter in industrial waters, occurs.

Thus, the greater capacity of zinc as a flocculating agent over other common ions is the first significant feature of our discovery, and this is supplemented by the fact that the zinc salt functions without the aid of any additional agent other than caustic soda or other alkali.

The expression "industrial waste waters," as embodied in the claims, is intended to include within its scope particularly sewage effluents as well as coal and ore washery waters, such as that resulting from coal and ore cleaning operations, but it will be understood that the generic significance of the expression is not to be taken as precluding an appropriate lattitude of interpretation with respect to any industrial waste waters which are reasonably within the scope of the present invention.

Although we have herein described various applications of our invention, it will be understood that these are described only as applications thereof, and we do not wish to be limited except by the appended claims.

We claim:

1. The method of removing suspended particles from an industrial waste water containing colloidal protein material which comprises adding to said industrial waste water an alkaline substance from the group consisting of alkali metal and alkaline earth metal compounds in an amount sufficient to provide an alkalinity within the approximate range of pH 9 to pH 10.8, and adding to the said waste water a zinc salt from the group consisting of zinc chloride and zinc sulphate to form a flocculating agent therein, thereby precipitating the suspended particles under conditions wherein they are decharged, dehydrated and coalesced.

2. The method of removing suspended particles from an industrial waste water containing colloidal protein material which comprises adding to said solution an alkaline substance from the group consisting of alkali metal and alkaline earth metal compounds in an amount sufficient to provide an alkalinity within the approximate range of pH 9 to pH 10.8, and adding to the industrial waste water a zinc salt from the group consisting of zinc chloride and zinc sulphate in the approximate amount of between 0.5 and 2 grains per gallon of said waste water to form a flocculating agent therein substantially without unreacted zinc salt remaining, thereby precipitating the suspended particles under conditions wherein they are decharged, dehydrated and coalesced.

3. The method of clarifying coal washery water which comprises adding to said coal washery water an alkaline substance from the group consisting of alkali metal and alkaline earth metal compounds in an amount sufficient to provide an alkalinity within the approximate range of pH 10 to pH 10.8, and adding to the resultant washery water a zinc salt from the group consisting of zinc chloride and zinc sulfate in the approximate amount of between 1 and 2 grains per gallon of washery water to form a flocculating agent therein substantially without unreacted zinc salt remaining, thereby precipitating the suspended particles under conditions wherein they are decharged, dehydrated and coalesced.

4. The method of clarifying ore washery water which comprises adding to said ore washery water an alkaline substance in an amount sufficient to provide an alkalinity within the approximate range of pH 10 and pH 10.8, and adding to the washery water a zinc salt from the group consisting of zinc chloride and zinc sulfate in an amount of approximately 1 to 2 grains per gallon of washery water to form a flocculating agent therein substantially without unreacted zinc salt remaining, thereby precipitating the suspended particles under conditions wherein they are decharged, dehydrated and coalesced.

5. The method of removing suspended particles including organic colloidal material and reducing the bacterial content in aqueous sewage disposal effluents which comprises adding to said effluent sodium hydroxide in an amount sufficient to provide an alkalinity of approximately pH 9.8, and adding to the effluent zinc chloride in the amount of approximately ½ grain per gallon of effluent to form a flocculating agent therein substantially without unreacted zinc chloride remaining, thereby precipitating the suspended particles and bacterial content under conditions wherein they are decharged, dehydrated and coalesced.

WILLIAM SEIFRIZ.
EUGENE J. McCUE.

REFERENCES CITED

The following references are of record in the file of this patent:

UNITED STATES PATENTS

| Number | Name | Date |
|---|---|---|
| 668,820 | Jones | Feb. 26, 1901 |
| 1,757,526 | Hedgpeth | May 6, 1930 |
| 1,860,781 | Liebknecht | May 31, 1932 |
| 1,862,265 | Henry | June 7, 1932 |
| 1,966,733 | Reimers | July 17, 1934 |
| 2,074,082 | Domogalla | Mar. 16, 1937 |
| 2,300,693 | Oswald | Nov. 3, 1942 |

FOREIGN PATENTS

| Number | Country | Date |
|---|---|---|
| 17,109 | Great Britain | of 1895 |
| 435,126 | Great Britain | Sept. 16, 1935 |

OTHER REFERENCES

Journal Chemical Society, London, vol. 127, 1925, pp. 2124–27.

Journal American Chemical Society, vol. 38, 1916, pp. 785–788.

Journal American Leather Chemists Asso., vol. 29, 1934, pp. 3–16 and 52.